3,459,863
COLOR-STABLE ASCORBIC ACID TABLET

Henry M. Apelian, Clark, and Jack Blodinger, Westfield, N.J., assignors to Merck & Co., Inc., Rahway, N.J., a corporation of New Jersey
No Drawing. Filed Oct. 14, 1966, Ser. No. 586,652
Int. Cl. A61k 15/00
U.S. Cl. 424—280     1 Claim This invention relates to the preparation of solid tableting compositions. Particularly, the invention relates to the preparation of granular compositions suitable for direct compression to form tablets thereof. More specifically, the invention concerns the preparation of such granular compositions containing ascorbic acid. A further object is the provision of an improved process for preparing these granular compositions.

In the pharmaceutical industry, it is a well known fact that very few crystalline or powdered materials can be directly compressed into suitable tablets on automatic tableting equipment. This is particularly true in the case of ascorbic acid. At the present time, there are two well known methods for preparing ascorbic acid tablets, namely, the wet granulation method and the dry method, which is also known as "slugging." The wet mehod has the following eight separate and distinct production operations:

(1) Preparation of powder blend of ascorbic acid
(2) Preparation of binder solution
(3) Granulation
(4) Screening
(5) Drying
(6) Rescreening
(7) Blending with lubricant and disintegrating agent
(8) Compression The dry slugging method has the following six steps:

(1) Preparation of powder blend of ascorbic acid
(2) Slugging
(3) Grinding slug
(4) Sieving out fines and reslugging them
(5) Blending with lubricant and disintegrating agent
(6) Compression In both of these methods, the amount of equipment, labor, floor space and time required is substantial. The preparation of ascorbic acid tablets by direct compression, on the other hand, would involve only two essential steps, namely, preparation of the powder blend and compression, thereby resulting in substantial production savings.

More specifically, the principal process used in the prior art involves blending ascorbic acid with most of the starch, milling this blend, granulating it with a binder dissolved in a hydro alcoholic medium, milling the wet granules, drying, milling again, and then adding the lubricant and the rest of the starch and blending once more. The problem of the prior art process is that in the granulating stage, very large and tough lumps are produced. This particular problem is effectively avoided in the process of the present invention in which small uniform granules are produced eliminating the need for wet milling.

In the formulations of ascorbic acid known to the art for the production of tablets, color instability has been noted, that is to say, ascorbic acid tablets which have a brilliant white color when freshly manufactured will deteriorate in appearance and acquire a yellowish tone. While this change in color does not affect the therapeutic efficacy of the tablets, the aesthetic deterioration is such as to detract from the salability of the product. Hence, a tablet which is color stable for a greater length of time than that known to the art must be considered as a highly desirable product. It is a further object of the present invention to provide a composition from which there may be produced tablets containing ascorbic acid of a color stability not achieved heretofore.

It has been discovered that such highly desirable color stability of the granular compositions of the present invention may be achieved by changing the formulation of the lubricant used in the granulation process. Experiments carried out on known lubricants have shown that the presence of magnesium stearate is in some manner responsible for the color deterioration. The formulation of the present invention replaces the magnesium stearate with a mixture of a colloidal silica product, a hydrogenated vegetable oil product and zinc stearate.

In the process of the present invention, ascorbic acid, approximately 40% of the starch and a pharmaceutically acceptable water and alcohol soluble gum are milled together, and an alcohol added thereto. It is preferred to use as a gum, a hydroxyalkyl alkylcellulose such as hydroxypropyl methylcellulose, a cellulose ether, such as Klucel (obtained from Hercules Co., Wilmington, Del.) or a polymethyl vinyl ether maleic anhydride such as Gantrazan (obtained from General Aniline & Film Corp., New York, N.Y.); while these products are available in several grades, it is preferred to use a grade having a viscosity in the range of 20 to 4000 cps. As an alcohol, it is preferred to use isopropyl alcohol containing from 5–10% water; however, any other alcohol which is customarily used in preparing tableting compositions such as ethanol may be empolyed. After mixing for from about 10 to about 20 minutes, a further quantity of starch equal to approximately 40% of the starch to be used is added to the wet granulation mixture and the mixing continued until small uniform granules are formed. It is this step of adding the starch to the wet granulation mixture which is novel, since in the granulation procedures known to the art, it is necessary to screen and remill the wet granulation formed since the granules produced in these known processes are too bulky for uniform drying and subsequent use in the tableting step. Whereas in the process of the present invention, the granules formed in the wet granulation step are small and uniform, thus, the step of wet milling is eliminated.

The granules are then dried for from about 8 to about 12 hours at a temperature of from 35° to 50° C., preferably 40° to 45° C. and passed through a screen, a suitable screen is one having a mesh of from No. 10 to No. 16 (American standard sieve), preferably No. 12 mesh, to this screened composition there is added the lubricant.

The lubricant of this invention s a previously blended mixture comprising an expanded or colloidal silica, preferably the blend of colloidal silica known as Cab-O-Sil M–5 (obtainable from the Cabot Corp., Boston, Mass.), or Zeolex (obtainable from J. M. Huber Corp., New York, N.Y.), a hydrogenated vegetable oil, preferably Sterotex-K (obtainable from Capital City Products Co., Columbus, Ohio), or Duratex (obtainable from Durkee Famous Foods Division of Glidden Corp., Jamaica, N.Y.), the remaining starch and zinc stearate. The granular composition and the lubricant are then mixed, suitably for from about 5 to about 15 minutes to produce the composition of the present invention which may then be directly compressed to form ascorbic acid tablets. It has been found that a certain amount of latitude of proportion is permissable in the composition of the present invention while maintaining the advantages of the process for preparing it and also the advantages accruing to the final manufactured product.

The final granulating composition to be used for direct compression of the present invention may comprise from

| | Percent |
|---|---|
| Ascorbic acid (USP fine powder for tableting grade) | 50–80 |
| Starch (USP dried) | 14–44 |
| Water and alcohol soluble gum (50 cps.) | 2.5–5 |
| Colloidal silica | 0.25–2 |
| Hydrogenated vegetable oil | .5–2 |

In the formation of which there may be employed from about 0.25 to about 0.35 liter of alcohol per kilo of ascorbic acid.

The color stability of tablets prepared from the granular composition of the present invention has been compared to that of tablets prepared from a trade sample known to contain magnesium stearate as a lubricant. In these experiments, tablet samples were prepared by the usual methods known to the art and stored in the standard containers used for such tablets, and stored under various conditions for periods of from 72 hours to 6 weeks. The color measurements were made with a Colormaster differential colorimeter, (Manufacturers Engineering and Equipment Corp., Hatboro, Pa.), in addition to visual observations of color change.

The following examples are given for the purpose of illustration and not by way of limitation.

EXAMPLE 1

Production of tablets of ascorbic acid

The following proportion of components are employed in producing the granular composition:

| | |
|---|---|
| Ascorbic Acid, USP fine powder for tableting _____kg__ | 83.338 |
| Starch corn USP low moisture _____kg__ | 13.413 |
| Hydroxypropyl methylcellulose, 50 cps. __kg__ | 3.250 |
| Starch corn USP low moisture _____kg__ | 15.000 |
| Cab-O-Sil M-5 _____kg__ | 1.250 |
| Sterotex-K _____kg__ | 1.250 |
| Starch corn USP low moisture _____kg__ | 7.313 |
| Zinc stearate, USP 200 powder _____kg__ | 0.188 |
| Total kg. _____ | 125.000 |
| Isopropyl alcohol, NF _____l__ | 27 |
| Distilled water _____l__ | 3 |

The ascorbic acid, the hydroxypropyl methylcellulose and 13.4 kg. of starch are milled together, transferred to a mixing bowl, and a mixture of the alcohol and water added in divided quantities (from 22 to 24 liters of the mixture being required), 15 kilos of the starch is then added and the mixture mixed for 45 minutes. The resulting uniform granules are spread on trays and dried for 12 hours at a temperature of between 40° C. to 45° C., cooled and screened through a No. 12 screen. The Cab-O-Sil, Sterotex-K, zinc stearate and the rest of the starch are blended and added to the granules. The components are mixed for 5 minutes to produce the desired granular composition suitable for the preparation of tablets by direct compression.

EXAMPLE 2

The color stability of tablets obtained from the granular composition prepared in accordance with Example 1 was compared with that of tablets prepared from a trade sample known to contain magnesium stearate as a lubricant in the following manner:

Tablets were prepared from both tableting compositions by standard methods and stored at room temperature, and at 40° C. in standard containers and also in open weighing dishes in a closed desicator at a temperature of 40° C. in an atmosphere of 75% relative humidity maintained by a saturated solution of sodium chloride. The color of the samples were measured immediately after manufacture and at periods of 72 hours, 1 week, 2 weeks, 3 weeks, 4 weeks and 6 weeks thereafter.

The measurements were carried out on a Colormaster differential colorimeter (Manufactures Engineering and Equipment Corp., Hatboro, Pa.), in addition to visual observations of color change. The instrument employed has three color scales. The a scale (not employed) which measures redness or greenness, the b scale which measures yellowness or blueness and the L scale which measures lightness. In these experiments, the relative degree of brownness (Br) was determined by means of the formula $b/L \times 100$, where b is the reading on the b scale and L is the reading on the L scale of the colorimeter.

ASCORBIC ACID TABLETS COLOR STABILITY vs. TRADE SAMPLE "X"

| Period | Trade Sample "X" | | | | Tables from composition from Example 1 | | | |
|---|---|---|---|---|---|---|---|---|
| | L | b+ | br | Visual Obs. | L | b+ | br | Visual Obs. |
| Room temp.: | | | | | | | | |
| Initial | 91.9 | 3.7 | 4.1 | Dull white | 91.4 | 2.5 | 2.7 | Bright white. |
| 72 hrs | 92.1 | 3.7 | 4.0 | do | 91.7 | 2.0 | 2.2 | Do. |
| 2 wks | 92.5 | 4.5 | 4.9 | do | 91.2 | 3.3 | 3.6 | Do. |
| 6 wks | 92.5 | 4.8 | 5.2 | do | 91.6 | 2.6 | 2.8 | Do. |
| 40° C.: | | | | | | | | |
| 72 hrs | 91.9 | 4.2 | 4.6 | do | 91.5 | 2.5 | 2.7 | Do. |
| 1 wk | 91.8 | 4.8 | 5.2 | do | 91.3 | 2.7 | 3.0 | White. |
| 2 wks | 92.0 | 5.7 | 6.2 | do | 91.4 | 5.7 | 4.1 | Do. |
| 3 wks | 91.6 | 5.8 | 6.3 | do | 90.9 | 3.6 | 4.0 | Do. |
| 4 wks | 91.4 | 6.4 | 7.0 | do | 91.0 | 4.1 | 4.5 | Do. |
| 6 wks | | No sample | | | 90.9 | 3.8 | 4.2 | Dull white. |
| 40° C.+75%R.H., exposed: | | | | | | | | |
| 72 hrs | 91.0 | 7.2 | 7.9 | Creamy | 91.7 | 2.7 | 2.9 | White. |
| 1 wk | 89.0 | 9.8 | 11.0 | Light beige | 91.1 | 3.5 | 3.8 | Do. |
| 2 wks | 86.9 | 13.8 | 15.9 | Beige | 89.6 | 9.6 | 10.7 | Creamy. |
| 3 wks | 83.5 | 17.0 | 20.4 | do | 89.3 | 8.5 | 9.6 | Do. |
| 4 wks | 82.5 | 18.3 | 22.2 | do | 88.8 | 9.8 | 11.1 | Light beige. |

These results indicate that under all conditions observed, the tablets made from the composition of Example 1 are less brown, i.e., have a better color stability than the trade samples.

We claim:

1. A color-stable ascorbic acid tablet prepared by a process comprising milling 50 to 80 parts of ascorbic acid, 5.5 to 16 parts of starch and 2.5 to 5 parts of hydroxypropyl methylcellulose having a viscosity of 20 to 4000 cps., adding to and mixing therewith from 0.25 to 0.35 liter of an alcohol per kilogram of ascorbic acid to form wet granules, adding thereto 5.5 to 16 parts of starch, drying the granules, passing the dried granules through a No. 10 to No. 16 mesh screen, adding to said granular screened composition and mixing therewith a previously blended lubricant comprising 0.25 to 2 parts of colloidal silica, from 0.5 to 2 parts of hydrogenated vegetable oil, from 0.1 to 0.5 part of zinc stearate, and from 2.8 to 8.8 parts of starch, and compressing this mixture into a tablet.

References Cited

UNITED STATES PATENTS 3,266,992   8/1966   deJong _____ 424—280

RICHARD L. HUFF, Primary Examiner

S. K. ROSE, Assistant Examiner